Patented July 25, 1933

1,919,573

UNITED STATES PATENT OFFICE

ALBERT SCHMELZER, FRITZ BALLAUF, AND FRIEDRICH MUTH, OF ELBERFELD, GERMANY, ASSIGNORS TO GENERAL ANILINE WORKS, INC., OF NEW YORK, N. Y., A CORPORATION OF DELAWARE

AZODYESTUFF

No Drawing. Application filed November 14, 1929, Serial No. 407,275, and in Germany November 16, 1928.

The present invention relates to water-insoluble azodyestuffs and more particularly to azodyestuffs of the probable general formula:

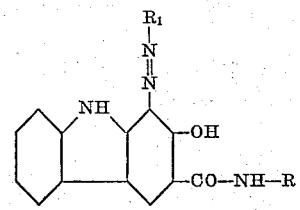

wherein R stands for a radical of the benzene or naphthalene series and $R_1$ stands for the residue of a diazotizable aromatic or heterocyclic amine.

These new azodyestuffs which are obtainable by coupling a diazotized aromatic or heterocyclic amine with a 2-hydroxy-carbazole-3-carboxylic acid arylamide either on the fibre, in substance or on a substratum, possess very good properties of fastness especially to light. The shades of these dyestuffs are of the most different kind, for instance yellow, red-brown, blue and violet shades are obtainable, according to the amine used in their preparation.

In the dry state the dyestuffs form yellow to dark powders which yield upon reduction with hydrochloric acid and stannous chloride 1 mol of a 1-amino-2-hydroxy-carbazole-3-carboxylic acid arylamide and 1 mol of an aromatic or heterocyclic amine.

Our invention is illustrated by the following examples without being limited thereto:

*Example 1.*—The well boiled and dried cotton yarn is impregnated by a solution of 3 gm. 2-hydroxy-carbazole-3-carboxylic acid-α-naphthalide, 6 cc. of an aqueous sodium hydroxide solution of 34° Bé. and 6 cc. of Turkey red oil in one liter, wrung out, rinsed and soaped without drying and then developed in a diazo solution, neutralized with sodium acetate, containing 2 gm. of 2-aminocarbazole in one liter. There is thus obtained a beautiful and fast brownish Bordeaux-red shade. The dyestuff thus produced on the fiber has the following probable structure:

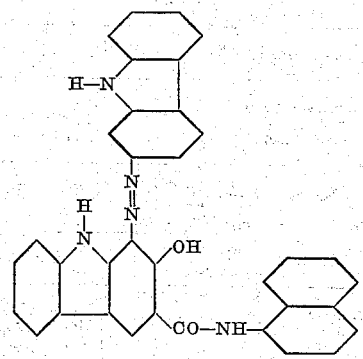

The 2-hydroxycarbazole-3-carboxylic acid-arylamides mentioned are obtainable from 2-hydroxycarbazole-3-carboxylic acid and an aromatic amine, according to the usual methods for instance, by condensation in a boiling toluene solution by means of phosphorus trichloride or by acting upon the acid chlorides with amines.

*Example 2.*—When using 3 gm. of 2-hydroxycarbazole-3-carboxylic acid o-toluidide instead of the α-naphthyl-amide used in Example 1, and 1-diazo-2-methoxy-5-nitrobenzene as coupling component and working in the same manner as indicated in Example 1, a dyestuff of the probable formula:

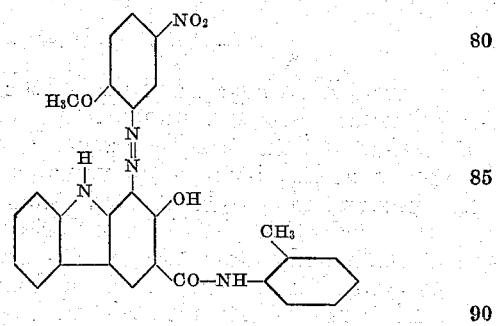

will be obtained having excellent fastness properties and a red-brown shade.

The following table shows a series of further combinations and their shades:

*The 2-hydroxycarbazole-3-carboxylic acid-anilide*

| Combined with | Yields shades |
|---|---|
| Dianisidine | Blue black |
| o-phenetidine-azo-α-naphthylamine | Bluish |
| m-nitro-o-anisidine | Yellow-brown |
| p-nitro-o-anisidine | Brown |
| 2-amino-carbazole | Red-brown |
| 9-ethyl-3-amino-carbazole | Red-brown |

*The 2-hydroxycarbazole-3-carboxylic acid-α-naphthalide*

| Combined with | Yields shades |
|---|---|
| Dianisidine | Dark blue |
| o-phenetidine-azo-α-naphthylamine | Deep-black |
| m-nitro-o-anisidine | Red-brown |
| p-nitro-o-anisidine | Reddish brown |
| 2-amino-carbazole | Brownish Bordeaux |
| 9-ethyl-3-amino-carbazole | Bordeaux |

*The 2-hydroxycarbazole-3-carboxylic acid-β-naphthalide*

| Combined with | Yields shades |
|---|---|
| 5-nitro-o-anisidine | Brown |
| 2-amino-carbazole | Brownish Bordeaux |
| 9-ethyl-3-amino-carbazole | Bordeaux |

*The 2-hydroxycarbazole-3-carboxylic acid-p-anisidide*

| Combined with | Yields shades |
|---|---|
| 2-amino-carbazole | Brownish Bordeaux |
| 9-ethyl-3-amino-carbazole | Bordeaux |
| 2,5-dichlor-aniline | Yellowish brown |
| 5-nitro-2-anisidine | Reddish brown |

*The 2-hydroxycarbazole-3-carboxylic-o-anisidide*

| Combined with | Yields shades |
|---|---|
| 2,5-dichlor-aniline | Yellowish brown |
| 5-nitro-2-anisidine | Brown |

We claim:

1. As new products water-insoluble azodyestuffs of the probable general formula:

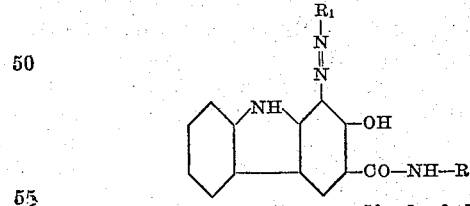

wherein R stands for a radical of the benzene or naphthalene series and $R_1$ stands for the residue of a diazotizable aromatic or heterocyclic amine, being very valuable azodyestuffs of yellow to black shades and yielding upon reduction with hydrochloric acid and stannous chloride 1 mol of a 1-amino-2-hydroxy-carbazole-3-carboxylic acid arylamide and 1 mol of an aromatic or heterocyclic amine.

2. As a new product the azodyestuff of the probable formula:

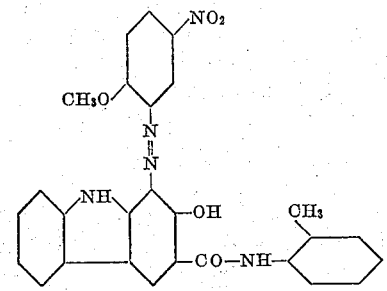

being in the dry state a red brown powder and yielding when produced on the fiber red brown shades of excellent fastness properties, and yielding upon reduction with hydrochloric acid and stannous chloride 1 mol. of 1-amino-2-hydroxy-carbazole-3-carboxylic acid o-toluidide and 1 mol of 1-amino-2-methoxy-5-nitrobenzene.

3. Fiber dyed with the dyestuff as claimed in claim 1.

4. Fiber dyed with the dyestuff as claimed in claim 2.

5. As a new product the azo dyestuff of the probable formula:

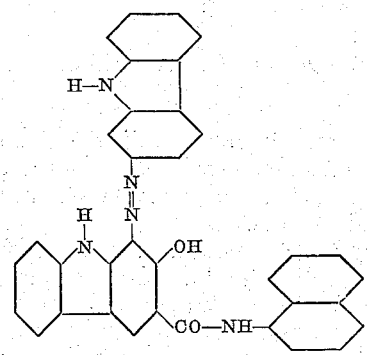

yielding fast brownish Bordeaux-red shades when produced on the fiber, and yielding upon reduction with hydrochloric acid and stannous chloride 1 mol of 1-amino-2-hydroxycarbazole-3-carboxylic acid α-naphthylamide and 1 mol of 2-aminocarbazole.

6. Fiber dyed with the dyestuff as claimed in claim 5.

7. As new products water-insoluble azodyestuffs of the probable general formula:

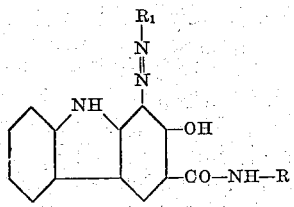

wherein R and $R_1$ stand for radicals of the benzene or naphthalene series, being very valuable azodyestuffs of yellow to black shades and yielding upon reduction with hydrochloric acid and stannous chloride 1 mol of a 1-amino-2-hydroxycarbazole-3-carboxylic acid arylamide and 1 mol of an aromatic amine of the benzene or naphthalene series.

8. As new products water-insoluble azodyestuffs of the probable general formula:

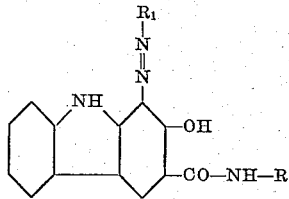

wherein R and R₁ stand for radicals of the benzene or naphthalene series which may be substituted by alkyl, nitro, alkoxy, a radical of the benzene azo series or halogen, being very valuable azodyestuffs of yellow to black shades and yielding upon reduction with hydrochloric acid and stannous chloride 1 mol of a 1-amino-2-hydroxy-carbazole-3-carboxylic acid arylamide and 1 mol of an aromatic amine of the benzene or naphthalene series.

9. As new products water-insoluble azodyestuffs of the probable general formula:

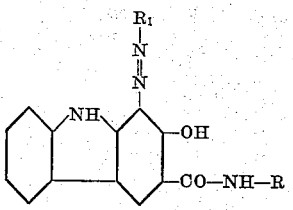

wherein R and R₁ stand for radicals of the benzene or naphthalene series which may be substituted by methyl, nitro, methoxy, a radical of the benzene-azo series or chlorine, being very valuble azodyestuffs of yellow to black shades and yielding upon reduction with hydrochloric acid and stannous chloride 1 mol of a 1-amino-2-hydroxycarbazole-3-carboxylic acid arylamide and 1 mol of an aromatic amine of the benzene or naphthalene series.

10. As new products water-insoluble azodyestuffs of the probable general formula:

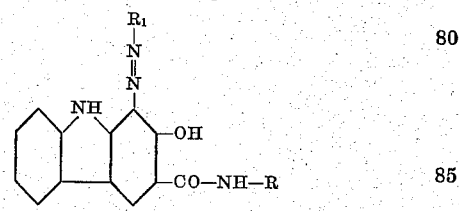

wherein R and R₁ stand for benzene nuclei which may be substituted by chlorine, methyl, methoxy or nitro, being very valuable azodyestuffs of yellow to black shades and yielding upon reduction with hydrochloric acid and stannous chloride 1 mol of a 1-amino-2-hydroxy-carbazole-3-carboxylic acid arylamide and 1 mol of an amine of the benzene series.

ALBERT SCHMELZER.
FRITZ BALLAUF.
FRIEDRICH MUTH.